United States Patent
Patzenhauer et al.

[11] Patent Number: 5,533,596
[45] Date of Patent: Jul. 9, 1996

[54] HYDRAULIC, ADJUSTABLE VIBRATION DAMPER FOR MOTOR VEHICLES

[75] Inventors: Andree Patzenhauer, Eitorf-Lindscheid; Winfried Geilhausen, Windeck-Leuscheid; Rolf Schneider, Windeck-Werfen, all of Germany

[73] Assignee: Fichtel & Sachs AG, Eitorf, Germany

[21] Appl. No.: 374,923

[22] Filed: Jan. 18, 1995

[30] Foreign Application Priority Data

Jan. 19, 1994 [DE] Germany .................. 44 01 393.0

[51] Int. Cl.$^6$ .......................... B60G 17/08; B60G 13/08; F16F 9/46
[52] U.S. Cl. .................. 188/299; 188/322.13; 188/318
[58] Field of Search .................. 188/322.15, 299, 188/322.13, 318, 322.14, 281, 282, 319, 322.22, 314, 315, 316, 317

[56] References Cited

U.S. PATENT DOCUMENTS 4,850,461  7/1989  Rubel .................. 188/322.15
5,207,300  5/1993  Engel et al. .................. 188/299

FOREIGN PATENT DOCUMENTS 4120122  1/1992  Germany .

*Primary Examiner*—Douglas C. Butler
*Attorney, Agent, or Firm*—Nils H. Ljungman and Associates

[57] ABSTRACT

A hydraulic, adjustable vibration damper for motor vehicles, with a damping piston fastened to a piston rod, which damping piston divides the work cylinder into two chamber halves filled with damping fluid, has a bypass located parallel to the valves of the damping piston. In the bypass there is at least one valve which reacts as a function of the pressure, and to control the bypass, there is a device to adjust a control body, which control body can be pressurized in the closing direction by a pressure medium. Between the pressure medium and the control body there can be an axially movable pressure intensifier which is sealed on its circumference, whereby corresponding to the pressure intensifier there can be an additional spring force which acts in the direction opposite to that of the pressure medium.

7 Claims, 8 Drawing Sheets

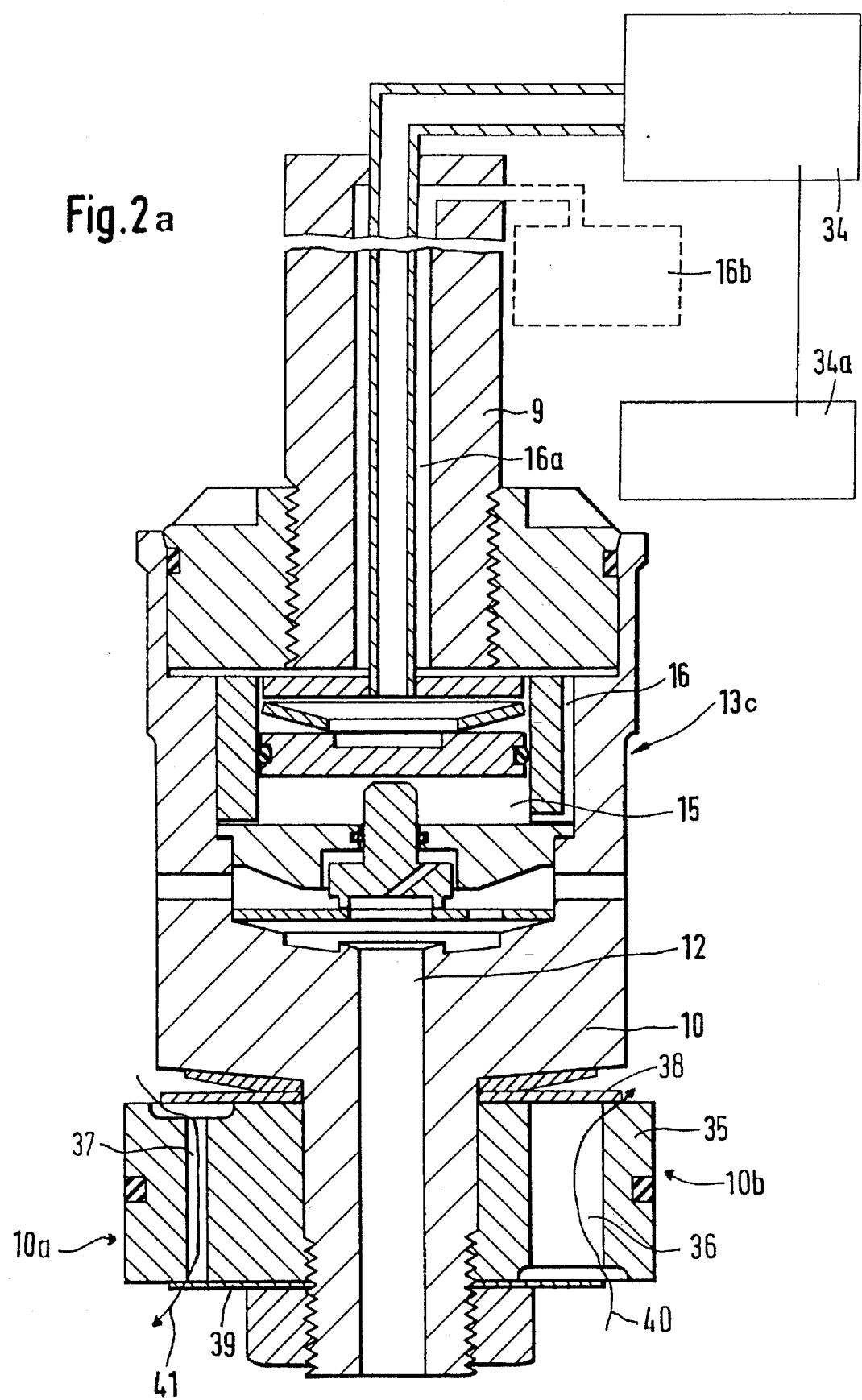

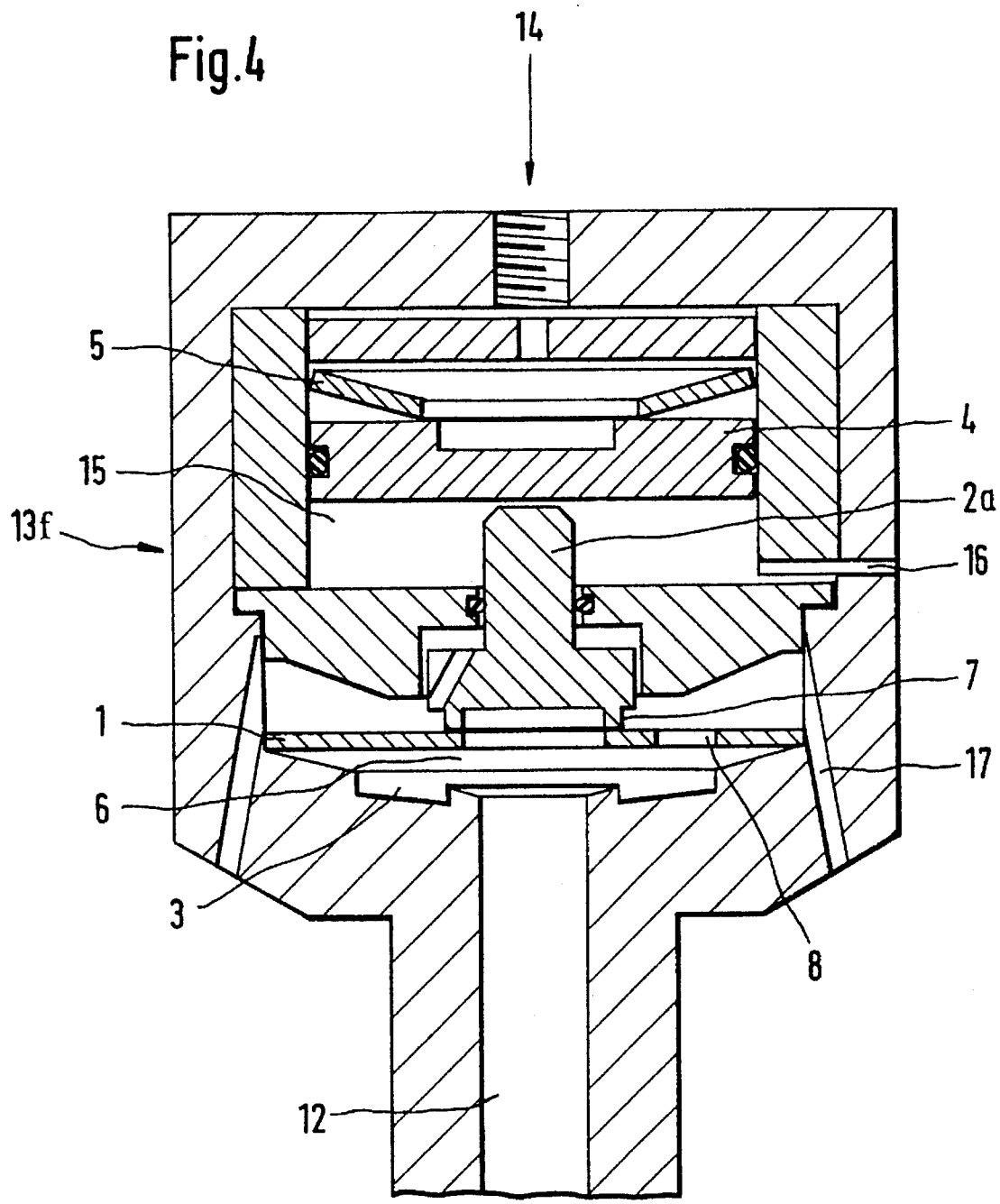

HYDRAULIC, ADJUSTABLE VIBRATION DAMPER FOR MOTOR VEHICLES

BACKGROUND OF THE INVENTION

1. Field of the Invention

This invention generally relates to a hydraulic, adjustable vibration damper for motor vehicles. Such a vibration damper can have a damping piston fastened to a piston rod, which damping piston divides the work cylinder into two chambers that are filled with damping fluid. There can preferably be damping valves in the damping piston, and a fluid bypass can be located parallel to the valves of the damping piston. In the bypass, there can be at least one valve which reacts, or operates, as a function of the pressure. To control the bypass, there can be a device to adjust a control body of the valve, which device can be pressurized in the closing direction of the control body by means of a pressure medium. Between the pressure medium and the control body, there can be an axially movable pressure intensifier which can be sealed about the circumference thereof.

2. Background Information

One such type of vibration damper, in which a control body pressurizes a bypass with the interposition of a pressure intensifier, is disclosed by Federal Republic of Germany Patent No. 41 20 122, which has correspondence to U.S. Pat. No. 5,207,300. In this vibration damper, the pressure intensifier is pressurized by an externally applied control pressure, e.g. hydraulically or pneumatically. In such a vibration damper, a higher damping is added to a base damping, so that as a result of the high damping, the roll stability of a vehicle, or the starting conditions of a truck, can be improved, and if the control pressure drops or disappears, as a result of the internal system pressure in the decompression stage of the vibration damper, the control body can be brought into the open position and can be held there automatically. The damping force characteristic of such a vibration damper can thereby be switched so that it is either progressive or degressive. A variation of the damping force characteristic, for example, more progressive or more degressive characteristics, cannot be achieved with such a device.

OBJECT OF THE INVENTION

The object of the present invention is therefore to create a hydraulic, adjustable vibration damper in which the control body of a bypass is pressurized, with the interposition of a pressure intensifier, by a hydraulic or pneumatic adjustment device, and whereby the damping can be modified in terms of its damping force characteristic and level to adjust to the current conditions both progressively and degressively.

SUMMARY OF THE INVENTION

The present invention teaches that this object can be accomplished by means of a valve unit which includes a biasing device that provides a force which acts in the direction opposite to the force of the pressure intensifier, and to the pressure medium acting on the intensifier.

Such an apparatus can essentially make it advantageously possible to use different control pressures to preferably achieve a change in the cross section of the bypass, and thereby essentially achieve a damping force adjustment which is a function of the opposing biasing force of the biasing device. As a result of the different pressurization of the pressure intensifier, a continuous damping force can essentially be achieved with a simultaneous modification of the characteristic, e.g. progressively or degressively.

An additional essential characteristic of the present invention is that the control body and the pressure intensifier, along with at least one biasing member, or spring, can be part of a bracing system. In one particularly favorable embodiment, the spring can preferably be a spring plate.

In another favorable embodiment, the spring can preferably pressurize the pressure intensifier, and/or the spring can preferably be coupled to the control body. One advantage of such an arrangement is that the additional spring force can either pressurize the pressure intensifier directly, or the additional spring force can be part of a bracing chain, whereby the spring acts on the control body and the control body acts on the pressure intensifier, each in the direction opposite to the external control pressure.

In an additional embodiment, the spring can preferably control the flow cross section of the bypass by means of the control body, and a constant passage can also be advantageously provided in the spring.

Further details of the present invention will be discussed herebelow with reference to the accompanying figures. It should be understood that when the word "invention" is used in this application, the word "invention" includes "inventions", that is, the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in an adjustable vibration damper for damping vibrations of a suspension of a motor vehicle, the damper comprising: a cylinder; damping fluid disposed within the cylinder; a piston rod projecting into the cylinder, the piston rod being movable axially within the cylinder; a damping piston disposed on the piston rod, the damping piston dividing the cylinder into a first chamber and a second chamber; apparatus for providing fluid communication between the first chamber and the second chamber; valve apparatus for regulating flow of damping fluid through the apparatus for providing fluid communication, the valve apparatus comprising: displaceable member apparatus, the displaceable member apparatus being movable in a first direction from a first substantially open position to a second substantially closed position to at least substantially close the apparatus for providing fluid communication and the displaceable member apparatus being movable from the second substantially closed position to the first substantially open position in a second direction to at least substantially open the apparatus for providing fluid communication; apparatus for applying a first force to the displaceable member apparatus to move the displaceable member apparatus in the first direction; and spring apparatus for providing a spring force in opposition to the first force, the spring apparatus operatively applying the spring force to the apparatus for applying the first force to oppose the first force over at least a portion of the distance between the first substantially open position and the second substantially closed position.

Another aspect of the invention resides broadly in an adjustable vibration damper system for damping vibrations of a suspension of a motor vehicle, the damper system comprising a vibration damper and a apparatus for adjusting a damping characteristic of the vibration damper, the vibration damper comprising: a first cylinder, the first cylinder having a first end and a second end; damping fluid disposed within the cylinder; a piston rod projecting into the cylinder through the first end of the cylinder, the piston rod being movable axially within the cylinder; a damping piston disposed on the piston rod, the damping piston dividing the cylinder into a first chamber and a second chamber; the damping piston comprising passage apparatus for providing fluid communication between the first chamber and the second chamber; the passage apparatus comprising first valve apparatus for damping flow of damping fluid through the passage apparatus; a fluid bypass disposed in parallel to the passage apparatus and connecting the first chamber and the second chamber, the bypass apparatus for bypassing flow of damping fluid about the damping piston upon movement of the piston rod into and out of the first cylinder to damp the movement of the piston rod; adjustable valve apparatus for controlling flow of damping fluid through the fluid bypass to vary the damping characteristics of the vibration damper, the adjustable valve apparatus comprising: displaceable member apparatus, the displaceable member apparatus being movable in a first direction from a first substantially open position to a second substantially closed position to at least substantially close the fluid bypass and the displaceable member apparatus being movable from the second substantially closed position to the first substantially open position in a second direction to at least substantially open the fluid bypass, the displaceable member apparatus being movable in the second direction by a pressure applied by damping fluid flowing through the fluid bypass; apparatus for applying a first force to the displaceable member apparatus to move the displaceable member apparatus in the first closing direction; and biasing apparatus for providing a second force in opposition to the first force, the biasing apparatus operatively applying the second force, in conjunction with fluid pressure, to the apparatus for applying the first force to oppose the first force over at least a portion of the distance between the first substantially open position and the second substantially closed position.

BRIEF DESCRIPTION OF THE DRAWINGS

Preferred embodiments of the present invention are schematically illustrated in the accompanying figures, in which:

FIG. 2a shows a vibration damper similar to that of FIG. 2, but with additional components;

FIGS. 4 and 5 illustrate additional embodiments of a damping valve with different configurations of the biasing member.

DESCRIPTION OF THE PREFERRED EMBODIMENT

Figure 1:
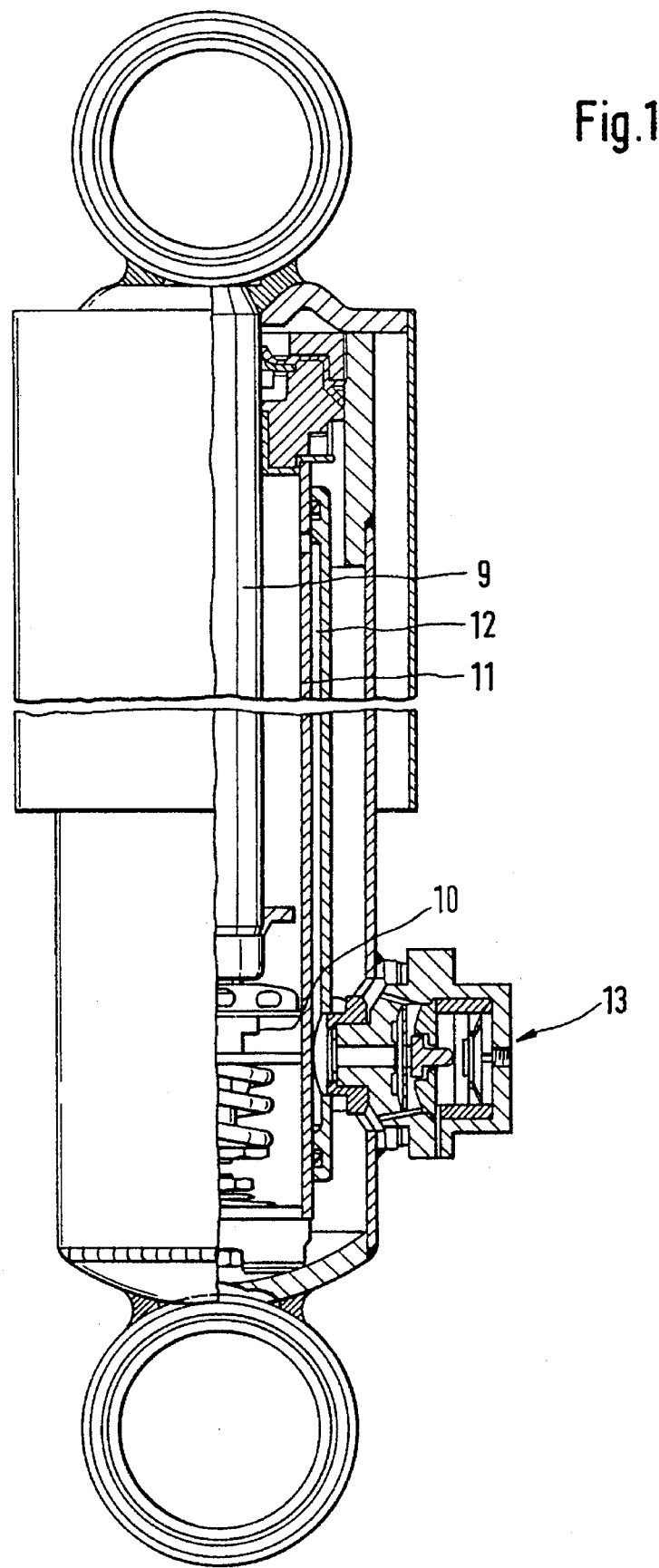
FIGS. 1 and 1a show a vibration damper in partial cross section, with a damping valve attached to the side of the damper.
Figure 1A:
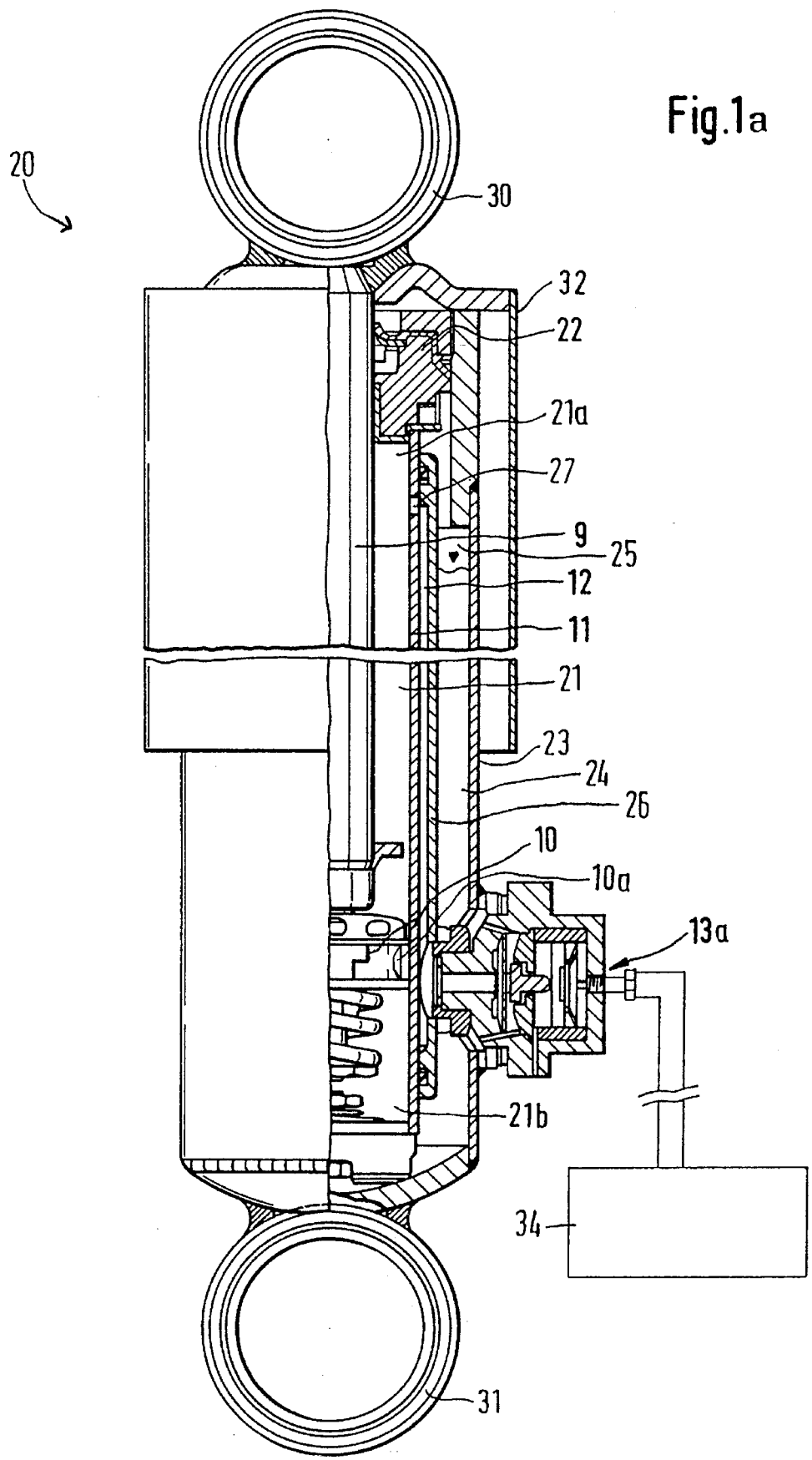

One type of vibration damper 20 in accordance with the present invention is illustrated in FIGS. 1 and 1a. In general, such a vibration damper can have an inner, or work cylinder 11, which defines a work chamber 21 therein. A piston rod 9 can preferably extend into the work chamber 21, and a damping piston 10 can preferably be disposed on the piston rod 9. The damping piston 10 can essentially divide the work chamber 21, within cylinder 11, into an upper chamber portion 21a and a lower chamber portion 21b. As shown in more detail in FIG. 2a, the damping piston 10 can preferably be equipped with valves 10a and 10b to generate a damping force by damping fluid flow between the two chambers 21a and 21b. The upper end of the work cylinder 11 can preferably be sealed by means of a piston rod guiding and sealing unit 22.

The depicted embodiment of FIG. 1 is essentially a two-tube vibration damper, and as such, has a second, or container tube 23 disposed about the work cylinder 11. This second tube 23 essentially defines a fluid reservoir 24 between the work cylinder 11 and the container tube 23. The reservoir 24 can also preferably have a volume compensation space 25 adjacent the upper end thereof.

In addition to the valves 10a and 10b in the piston 10, the upper chamber 21a can also preferably be in fluid communication with the lower chamber 21b by means of a bypass 12 and by means of a damping valve 13. The bypass 12 can preferably be disposed in parallel to the valves 10a, 10b. In the embodiment of FIG. 1 and 1a, the bypass 12 can preferably be formed by still another tube 26 disposed about the work cylinder 11. This bypass 12 can preferably be in fluid communication with the upper chamber 21a via at least one orifice 27 in the work cylinder 11. At the other end of the bypass 12, the bypass 12 can preferably be opened and closed by means of the damping valve unit 13, 13a. In this embodiment, the damping valve unit 13, 13a is preferably disposed externally on the outer tube 23. Additional details of this type of damping valve unit 13 are shown in FIG. 4.

For attachment of the vibration damper 20 to a motor vehicle, i.e., between a portion of a vehicle frame and a wheel suspension member, the damper 20 can preferably have fastening portions 30 and 31. In addition, the damper 20 could also be provided with a protective sleeve 32 about its upper portion thereof to protect the piston rod 9 when the piston rod 9 is withdrawn out of the damper 20, and to hinder access of dirt to the vicinity of the seal unit 22.

Figure 2:
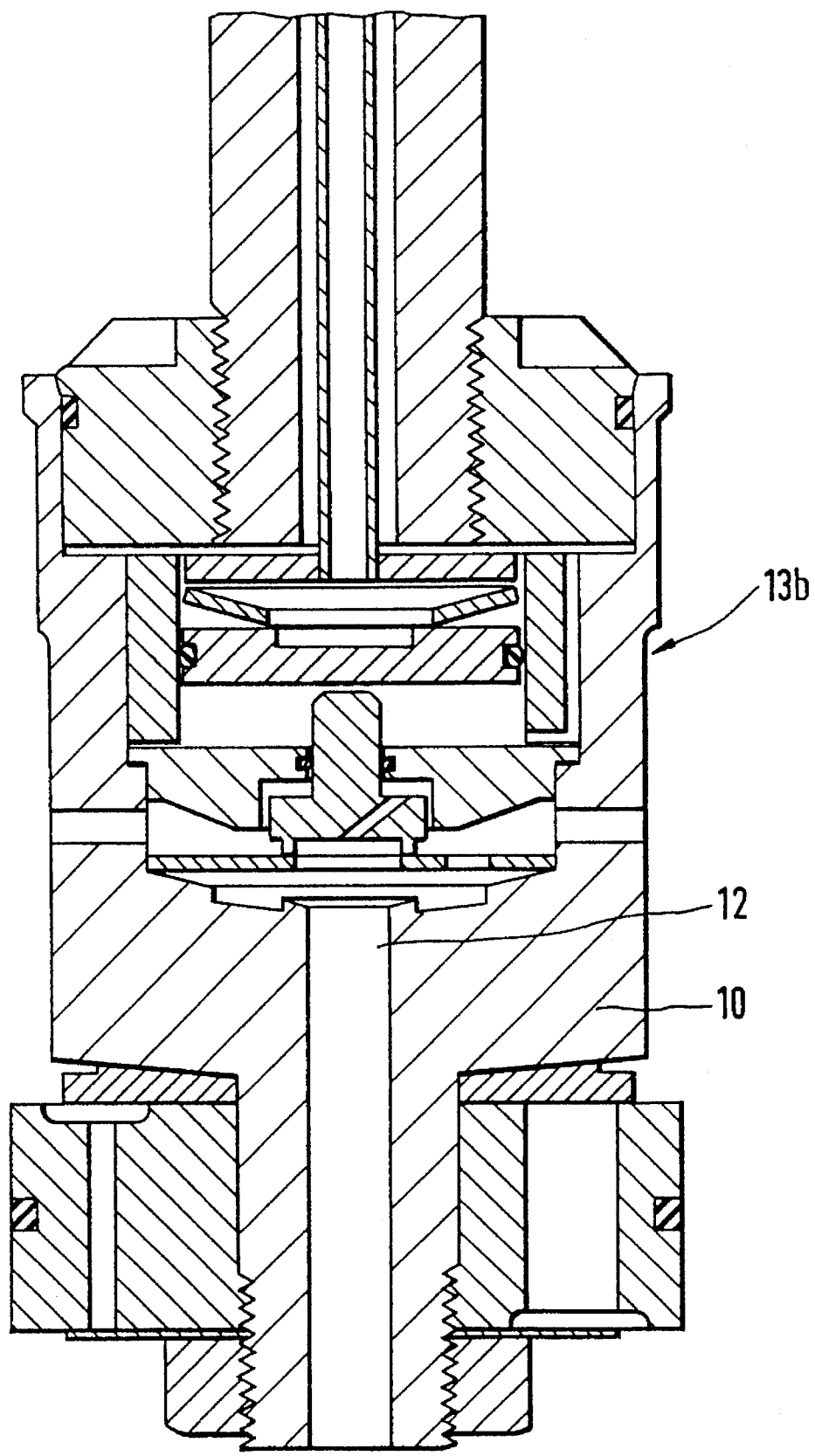
FIG. 2 shows a vibration damper in cross section with a damping valve integrated into the piston within the damper.
Figure 5:
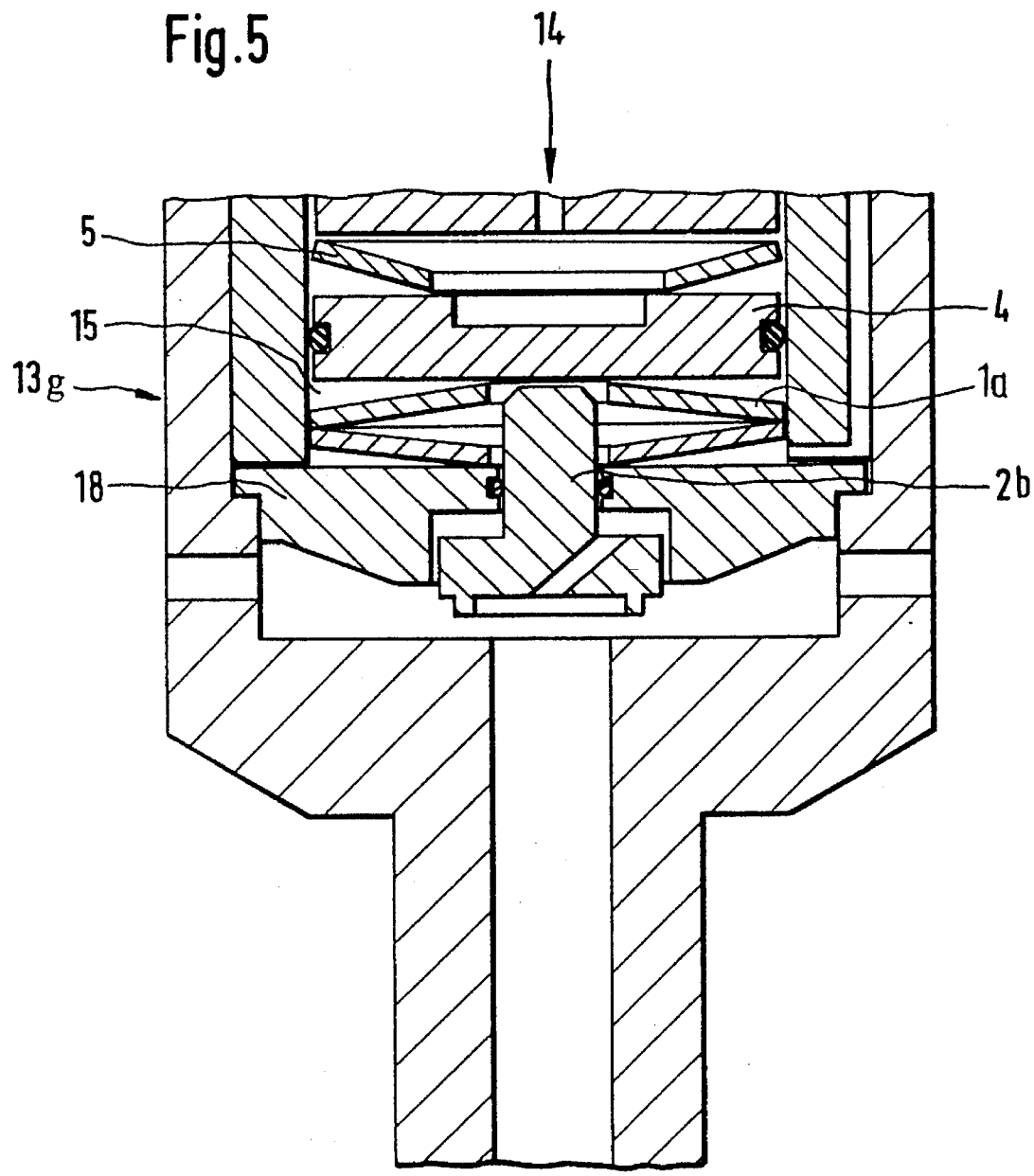

FIGS. 2 and 2a illustrate one possible variation of a vibration damper 20 as set forth hereabove. In essence, the components of the vibration damper 20, with the exception of the valve unit 13b, 13c and bypass 12, would preferably be the same as depicted in FIG. 1, and therefore a further depiction of the vibration damper components is not provided in FIGS. 2 and 2a. As such, FIGS. 2 and 2a essentially only show the piston unit 10 in greater detail. In the embodiment of FIGS. 2 and 2a, the damping valve unit 13b, 13c, which regulates the bypass 12, and the bypass 12, parallel to the damping valves 10a and 10b in the damping piston 10, are preferably located inside the damping piston 10, instead of externally to the working chamber 11 as shown in FIG. 1. Additional details of a damping valve 13d, 13g which can be utilized within the piston 10 are illustrated in FIGS. 3 and 5.

FIG. 2a illustrates in more detail the valves 10a and 10b, and as shown, such valves 10a and 10b can preferably be one-way valves. For this purpose, the piston 10 can preferably have a sealing body 35 for sealing against the inside of the work cylinder 11. This sealing body 35 can preferably have at least two passages 36 and 37 therethrough connecting the chambers 21a and 21b (see FIG. 1). As shown, the passage 36 can preferably have one end thereof open to the chamber 21b, while the passage 37 can have an end open to the chamber 21a. The other end of passage 36 can preferably be closed by a flexible plate 38, which flexible plate 38 can preferably be opened by fluid flowing in the direction of arrow 40, caused by an insertion of the piston 10 into the damper 20. The other end of passage 37 can preferably be closed by a flexible plate 39, which flexible plate 39 can preferably be opened by fluid flowing in the direction of arrow 41, caused by a withdrawal of the piston from the damper 20.

Figure 3:
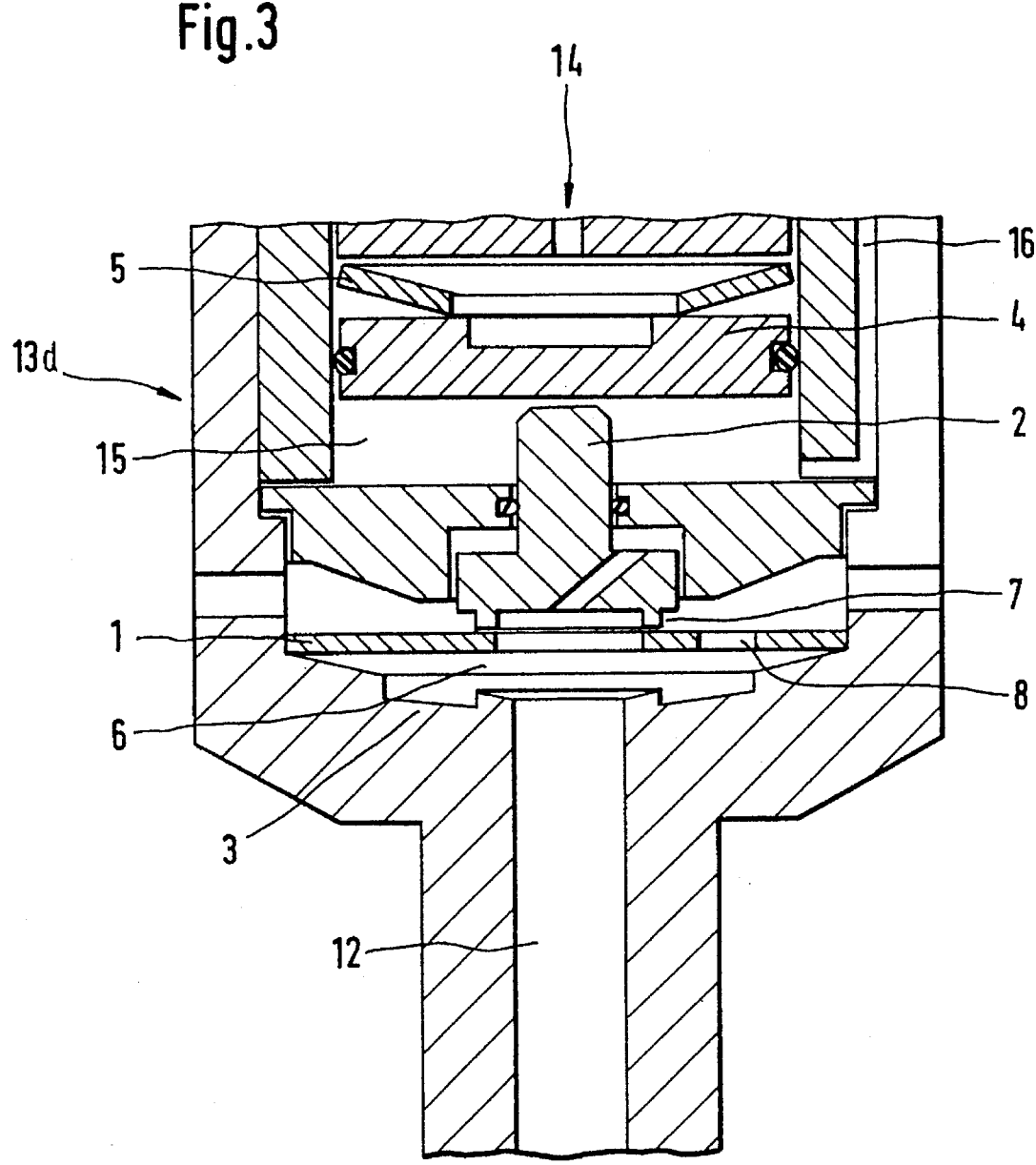
FIGS. 3 and 3a are details of an embodiment of a damping valve located in the piston.
Figure 3A:
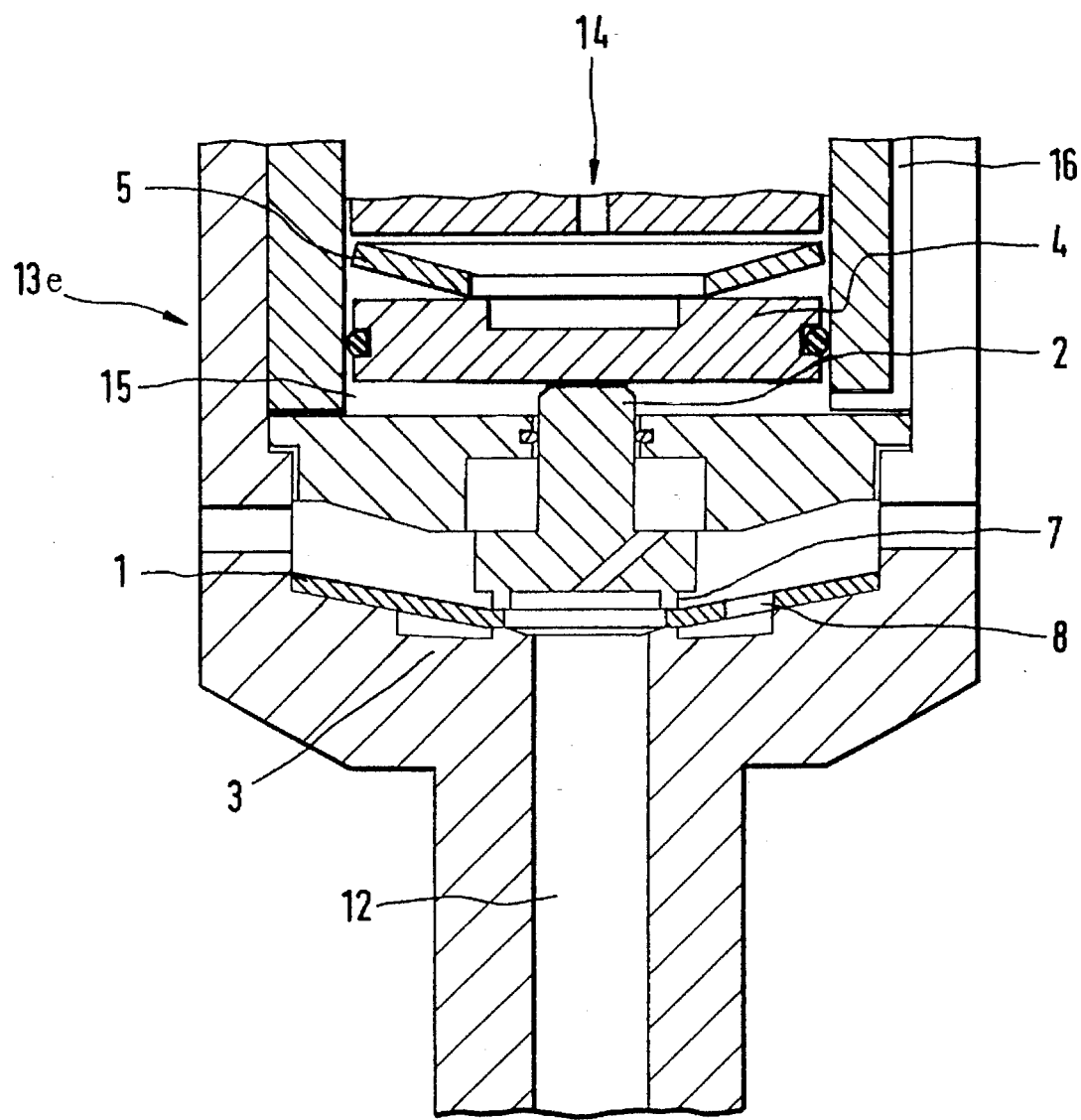

FIGS. 3 and 3a show details of the portion of the damping piston 10 which contains the damping valve 13d, 13e for the control of the bypass 12. The bypass 12 can essentially be opened or closed by the control body 2. A biasing member, such as the spring 1 can preferably be coupled to the control body 2 to form a control edge. Simultaneously, there can always be a small volume of fluid which can flow through the constant passage 8. A pressure can preferably be applied to the control body 2 by an external pressure 14. The external pressure 14 can preferably be applied in conjunction with a pressure intensifier 4 and an additional spring 5. Such pressure intensifiers are generally known (as shown in the earlier mentioned U.S. Pat. No. 5,207,300), and are therefore not described in greater detail herein.

In one possible configuration of the present invention, the springs 1 and 5 can preferably be formed by metal discs, or cones, which are flexible in a direction at least substantially perpendicular to a major plane thereof.

FIG. 2a shows one type of possible configuration of a pressure source 34 for applying the fluid pressure 14. Such a pressure source can essentially be a pump device for pumping air or liquid into the valve unit 13c. There can also preferably be a control unit 34a for controlling operation of the pressure source 34. Such a control unit can preferably be automatically actuated, but a user-actuated device could also be provided. FIG. 1a depicts one type of pressure source 34 and the connection thereof to a tube-mounted valve unit 13a.

As shown in FIGS. 2a and 3, a channel 16 can preferably be provided to allow any medium in the space 15 to escape from the space 15 during movement of the pressure intensifier 4 towards the passage 12, and also allow medium to reenter the space 15 upon release of the pressure 14 and movement of the pressure intensifier 4 away from the passage 12. This channel 16 can essentially be configured to feed into an additional passage 16a in the piston rod 9, to vent the space 15 directly into the atmosphere. In other possible embodiments, it might be desirable that the fluid in the space 15 be a liquid, in which case, a reservoir 16b (shown in outline in FIG. 2a) could be provided for containing the liquid.

The control body 2 can preferably be pressurized at an appropriate first pressure 14 by means of the pressure intensifier 4, to move the control body 2 into engagement with the spring 1. About the control body 2, there can preferably be a ring-shaped seat portion for contacting the spring 1. Thus, the control body 2, in conjunction with the spring 1, can close the bypass 12 with respect to the recess 17 at a first amount of pressure 14, and only the constant passage 8 can remain open, as depicted in FIG. 3. In the event of a further increase of the control pressure 14, the spring 1 can be curved downwardly in the plane of the drawing, as shown in FIG. 3a, so that the flow cross section 6 between the spring 1 and the recess 3 can also be closed. In this position, the constant passage 8 would also be closed.

When the external pressure 14 is reduced, and at the corresponding system pressure via the bypass 12, i.e., a damping fluid pressure in the bypass 12, the control body 2 can preferably be moved essentially continuously with respect to the spring 1, so that the corresponding desired damping characteristic can be achieved. Thus, the damping force can be adjusted by means of the control pressure, changing the characteristic from degressive, through linear, to progressive. Even at extremely low piston velocities, a high adjustment capability (spread) becomes possible.

In a further explanation of the possible positions of the control body 2 in relation to the spring 1 and the bypass 12, it can be provided that there would essentially be three operating stages of the vibration damper. A first stage would essentially have the bypass 12 fully opened, or the control body 2 would be disposed away from the spring 1. In this mode, there would essentially be unobstructed flow of damping fluid through bypass 12, and there would essentially be minimal damping of the vibration damper as a result of the valves 10a and 10b of the piston 10, and the relatively unobstructed flow of fluid through bypass 12. In a second stage, the bypass 12 could essentially be fully closed, that is, as depicted in FIG. 3a. In this second mode, there would essentially be maximally obstructed flow of damping fluid through bypass 12. Thus, there would essentially be a maximum damping of the vibration damper as a result of the valves 10a and 10b of the piston 10, and the minimal flow of fluid through bypass 12. The third mode of operation would essentially constitute the range between the first and the second, wherein the force of the spring 1 would counter the applied pressure 14. In other words, when the ring 7 is in contact with the spring 1, but the spring 1 is not fully depressed as shown in FIG. 3a. Thereby, some variation in the size of the cross section 6 would be provided, and thereby the amount of fluid flowing through bypass 12 would be continuously variable. In essence, a linear damping characteristic of the damper could possibly be provided.

FIG. 4 illustrates an additional embodiment, with the difference that this damping valve unit 13f can preferably be attached laterally to a vibration damper as illustrated in FIG. 1. Alternatively, such a damping valve could be a separate unit, separate from the vibration damper, and fluidly connected to the vibration damper by hoses. In this FIG. 4 embodiment of the valve unit 13f, the pressure 14 can also be applied externally to the pressure intensifier 4, by some sort of pressure source as shown in FIG. 2a. In addition, and in a manner similar to the FIG. 2, 2a embodiment as discussed above, the cavity 15 can be vented directly into the atmosphere via the channel 16. Otherwise, this damping valve 13f corresponds in principle to the damping valve described above with reference to FIG. 3.

FIG. 5 illustrates an additional embodiment, in which the control body 2b is again pressurized by the pressure intensifier 4, and here again the external pressure 14, together with an additional spring 5, acts on the pressure intensifier 4. In this embodiment, however, a spring 1a, which acts in the direction opposite to the pressure medium 14, can alternatively be located in the cavity 15. In this case, the spring 1a can preferably be supported, on one hand, against the base 18 and, on the other hand, against the pressure intensifier 4. Since the spring 1a is no longer disposed adjacent the passage 12, the passage 8 can also be eliminated from the spring 1a. In this embodiment, while the construction might be somewhat different, the function is essentially the same as that of the damping valve 13d illustrated in FIG. 3.

In other possible embodiments of the present invention, the spring 1, 1a could be formed by other types of biasing devices, for example, a coil spring, an elastomeric member, etc.

One feature of the invention resides broadly in the hydraulic, adjustable vibration damper for motor vehicles, with a damping piston fastened to a piston rod, which damping piston divides the work cylinder into two chamber halves filled with damping fluid, whereby in a bypass located parallel to the valves of the damping piston there is at least one valve which reacts as a function of the pressure, and to control the bypass, there is a device to adjust [See Translator's Note 1 on last page] a control body which can be pressurized in the closing direction by means of a pressure medium, whereby between the pressure medium and the control body there is an axially movable pressure intensifier which is sealed on the circumference, characterized by the fact that corresponding to the pressure intensifier 4 there is a spring force 1 which acts in the opposite direction to the pressure medium.

Another feature of the invention resides broadly in the vibration damper characterized by the fact that the control body 2 and the pressure intensifier 4, with at least one spring 1 are in a bracing chain (are part of a bracing system?).

Yet another feature of the invention resides broadly in the vibration damper characterized by the fact that the spring 1 is a spring plate.

Still another feature of the invention resides broadly in the vibration damper characterized by the fact that the spring 1 pressurizes the pressure intensifier 4.

A further feature of the invention resides broadly in the vibration damper characterized by the fact that the spring 1 is coupled to the control body 2.

Another feature of the invention resides broadly in the vibration damper characterized by the fact that the spring 1 controls the flow cross section 6 of the bypass by means of the control body 2.

Yet another feature of the invention resides broadly in the vibration damper characterized by the fact that the spring 1 has a constant passage.

Other types of adjustable vibration dampers for use in motor vehicles, and components thereof, which could possibly be used in conjunction with the embodiments of the present invention as set forth hereabove can possibly be found in the following U.S. Patents: U.S. Pat. No. 5,251,728 to Mund and Kramer, entitled "Hydraulic Vibration Damper or Shock Absorber With Electrical Control Connections and Connector Therefor"; U.S. Pat. No. 5,251,730 to Ackermann and Beck, entitled "Adjustable Vibration Damper"; U.S. Pat. No. 5,265,703 to Ackermann, entitled "Adjustable Hydraulic Vibration Damper for Motor Vehicles"; and U.S. Pat. No. 5,301,776 to Beck, entitled "Hydraulic Adjustable Vibration Damper".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. An adjustable vibration damper for damping vibrations of a suspension of a motor vehicle, said damper comprising:

a cylinder;

damping fluid disposed within said cylinder;

a piston rod protecting into said cylinder, said piston rod being movable axially within said cylinder;

a damping piston disposed on said piston rod, said damping piston dividing said cylinder into a first chamber and a second chamber;

means for providing fluid communication between said first chamber and said second chamber;

valve means for regulating flow of damping fluid through said means for providing fluid communication, said valve means comprising:

displaceable member means, said displaceable member means being movable in a first direction from a first substantially open position to a second substantially closed position to at least substantially close said means for providing fluid communication and said displaceable member means being movable from the second substantially closed position to the first substantially open position in a second direction to at least substantially open said means for providing fluid communication;

means for applying a first force to said displaceable member means to move said displaceable member means in said first direction;

spring means for providing a spring force in opposition to said first force, said spring means operatively applying said spring force to said means for applying said first force to oppose said first force over at least a portion of the distance between said first substantially open position and said second substantially closed position;

said means for applying said first force being pressure controlled by a pressure medium, and said means for applying said first force comprises:

means for providing said pressure medium into said valve means;

means for receiving pressure from said pressure medium and transmitting said pressure to said displaceable member means as said first force;

said spring means, said means for receiving and transmitting pressure, and said displaceable member means being braced against one another over said at least a portion of the distance between said first and second positions and interacting with one another over said at least a portion of the distance;

said spring means contacting and applying said spring force to at least one of:

said means for receiving and transmitting pressure; and said displaceable member means with said displaceable member means applying said spring force to said means for receiving and transmitting pressure;

said valve means of said means for providing fluid communication comprising first valve means;

said damping piston comprising passage means for providing fluid communication between said first and second chambers;

said passage means comprising second valve means for damping flow of fluid through said damping piston;

said means for providing fluid communication comprising fluid bypass means for bypassing fluid around said damping piston, said means for bypassing fluid being disposed in parallel with said passage means;

said displaceable member means being movable in said second direction in response to a second force applied to said displaceable member means by the damping fluid flowing within said fluid bypass;

said pressure medium comprising pressurized fluid acting on said means for receiving and transmitting pressure;

said fluid bypass having a cross section;

said cross section being increased upon movement of said displaceable member means in said second direction and decreased upon movement of said displaceable member means in said first direction;

said spring means controlling said cross section via said displaceable member means;

said first valve means additionally comprising a valve seat;

said spring means being disposed a distance from said valve seat;

said spring means comprising a spring plate;

said displaceable member means being movable a first distance in said first direction to contact said spring plate;

said displaceable member means and said spring plate being movable beyond said first distance in said first direction to press said spring plate in contact with said valve seat;

said spring plate comprising:
a first orifice therethrough, said first orifice being closeable by said displaceable member means contacting said spring plate; and
a second orifice therethrough, said second orifice being blocked upon said displaceable member means pressing said spring plate into contact with said valve seat;

said displaceable member means, in said first position, permitting substantially unobstructed flow of damping fluid through said fluid bypass via each of said first and second orifices;

said displaceable member means, when in contact with said spring plate and when said spring plate is out of contact with said valve seat, permitting flow of damping fluid through said second orifice; and said displaceable member means, in said second position, comprising said displaceable member means and said spring plate being in contact with said valve seat, to maximally obstruct flow of damping fluid through said fluid bypass.

2. The vibration damper according to claim 1, wherein:
said valve means is disposed at at least one of:
within said damping piston; and
externally of said vibration damper;
said pressure medium comprises one of:
air and liquid.

3. The vibration damper according to claim 2, wherein:
said valve means has a valve body for being disposed at said at least one of:
within said damping piston; and
externally of said vibration damper;
said valve body comprising a portion of said fluid bypass;
said valve body having a central longitudinal axis defined therethrough and a longitudinal dimension defined parallel to said longitudinal axis, with said displaceable member means being movable in a direction along said longitudinal dimension;
said valve body having a first fluid connection for being connected to one of said first and second chambers, and a second fluid connection for being connected to the other of said first and second fluid chambers, and an internal fluid chamber;

said first fluid connection comprising an orifice disposed substantially along said longitudinal axis;

said second fluid connection comprising an orifice disposed substantially perpendicular to said longitudinal axis and radially away from said longitudinal axis;

said valve seat being disposed about said orifice of said first fluid connection;

said spring plate being disposed within said internal fluid chamber in concentrical alignment with said orifice of said first fluid connection;

said first orifice of said spring plate being substantially aligned with said orifice of said first fluid connection, and said second orifice being disposed radially outward of said first orifice;

said first orifice has a diameter, and said displaceable member means has a diameter with the diameter of said displaceable member means being sufficiently larger than said diameter of said first orifice to substantially close said first orifice;

said displaceable member means having a valve body portion for contacting said spring plate, said valve body portion comprising a ring shaped projection with a diameter less than said diameter of said displaceable member means and greater than said diameter of said first orifice;

said second orifice having a diameter less than said diameter of said first orifice;

said valve means further comprises plate means disposed opposite to said first fluid connection;

said plate means being fixed with said valve body and defining a surface of said internal fluid chamber;

said displaceable member means comprises a first portion disposed within said internal fluid chamber, and a second portion extending from said first portion and extending through said plate means;

said valve means further comprises a second chamber disposed adjacent said internal fluid chamber and separated from said internal fluid chamber by said plate means;

said second chamber being oriented along said longitudinal axis;

said means for receiving and transmitting pressure being movably disposed within said second chamber for movement along said longitudinal dimension;

said second chamber having a peripheral wall defining the second chamber;

said means for receiving and transmitting pressure comprising seal means for sealing to said peripheral wall;

said means for receiving and transmitting pressure having a first side for contacting said second portion of said displaceable member means and a second side opposite said first side;

said pressure medium being disposed at said second side to pressurize said means for receiving and transmitting pressure and pressing said first side thereof into contact with said displaceable member means;

said second chamber comprising an additional surface disposed towards said second side of said means for receiving and transmitting pressure;

said valve means comprising a conical spring plate disposed between said second side of said means for receiving and transmitting pressure and said additional surface;

said second portion of said displaceable member means has a diameter, and said means for receiving and transmitting pressure having a diameter, said diameter of said second portion of said displaceable member means being about ⅕ of the diameter of said means for receiving and transmitting pressure;

said vibration damper additionally comprises a second cylinder disposed concentrically about said first cylinder;

said second cylinder defining an annular chamber about said first cylinder;

said annular chamber being substantially filled with damping liquid and comprising a volume compensation space filled with air;

said annular chamber being fluidly connected to said second chamber of said vibration damper;

said piston comprising means for being attached to a frame of a motor vehicle;

said second cylinder comprising means for being attached to a suspension of a motor vehicle;

said piston further comprises a protective sleeve disposed concentrically about said second cylinder to protect said piston rod upon withdrawal of said piston rod from said first cylinder; and said first and second cylinders have a first end, said piston rod extending through said first ends, and said first ends comprising a piston rod guiding and sealing means for positioning said first cylinder, said second cylinder, and said piston rod with respect to one another and sealing about said piston rod and said first and second cylinders.

4. An adjustable vibration damper system for damping vibrations of a suspension of a motor vehicle, said damper system comprising a vibration damper and a means for adjusting a damping characteristic of said vibration damper, said vibration damper comprising:

a first cylinder, said first cylinder having a first end and a second end;

damping fluid disposed within said cylinder;

a piston rod projecting into said cylinder through said first end of said cylinder, said piston rod being movable axially within said cylinder;

a damping piston disposed on said piston rod, said damping piston dividing said cylinder into a first chamber and a second chamber;

said damping piston comprising passage means for providing fluid communication between said first chamber and said second chamber;

said passage means comprising first valve means for damping flow of damping fluid through said passage means;

a fluid bypass disposed in parallel to said passage means and connecting said first chamber and said second chamber, said bypass means for bypassing flow of damping fluid about said damping piston upon movement of said piston rod into and out of said first cylinder to damp the movement of said piston rod;

adjustable valve means for controlling flow of damping fluid through said fluid bypass to vary the damping characteristics of the vibration damper, said adjustable valve means comprising:

displaceable member means, said displaceable member means being movable in a first direction from a first substantially open position to a second substantially closed position to at least substantially close said fluid bypass and said displaceable member means being movable from the second substantially closed position to the first substantially open position in a second direction to at least substantially open said fluid bypass, said displaceable member means being movable in said second direction by a pressure applied by damping fluid flowing through said fluid bypass;

means for applying a first force to said displaceable member means to move said displaceable member means in said first closing direction;

biasing means for providing a second force in opposition to said first force, said biasing means operatively applying said second force, in conjunction with fluid pressure, to said means for applying said first force to oppose said first force over at least a portion of the distance between said first substantially open position and said second substantially closed position;

said means for applying said first force being pressure actuated by a pressure medium from a pressure source external to said vibration damper, and said means for applying said first force comprising:

means for providing said pressure medium into said adjustable valve means;

means for receiving pressure from said pressure medium and transmitting said pressure to said displaceable member means as said first force;

said biasing means, said means for receiving and transmitting pressure, and said displaceable member means being braced against one another over said at least a portion of the distance between said first and second positions and interact with one another over said at least a portion of the distance between said first and second positions;

said biasing means contacting and applying said second force to at least one of:

said means for receiving and transmitting pressure; and said displaceable member means, with said displaceable member means transferring and applying said second force to said means for receiving and transmitting pressure;

said pressure medium comprising pressurized fluid acting on said means for receiving and transmitting pressure;

said system further comprising:

means for providing pressurized fluid to said adjustable valve means;

means for adjusting a pressure of said pressurized fluid provided to said adjustable valve means;

said fluid bypass having a cross section;

said cross section being increased upon movement of said displaceable member means in said second direction and decreased upon movement of said displaceable member means in said first direction;

said spring means controlling said cross section via said displaceable member means;

said adjustable valve means additionally comprising a valve seat;

said biasing means comprising a spring plate;

said spring plate means being disposed a distance from said valve seat;

said displaceable member means being movable a first distance in said first direction to contact said spring plate;

said displaceable member means and said spring plate being movable beyond said first distance in said first direction to press said spring plate in contact with said valve seat;

said spring plate comprising:
  a first orifice therethrough, said first orifice being closeable by said displaceable member means contacting said spring plate; and
  a second orifice therethrough, said second orifice being blocked upon said displaceable member means pressing said spring plate into contact with said valve seat;

said displaceable member means in said first position permitting substantially unobstructed flow of damping fluid through said fluid bypass via each of said first and second orifices;

said displaceable member means in contact with said spring plate and not contacting said valve seat permitting flow of damping fluid through said second orifice; and said displaceable member means in said second position comprising said displaceable member means and said spring plate in contact with said valve seat to maximally obstruct flow of damping fluid through said fluid bypass.

5. The vibration damper system according to claim 4, wherein:

said adjustable valve means is disposed at at least one of:
  within said damping piston; and
  externally of said vibration damper;

said pressure medium comprises one of:
  air and liquid.

6. The vibration damper according to claim 5, wherein:

said adjustable valve means has a valve body for being disposed at said at least one of:
  within said damping piston; and
  externally of said vibration damper;

said valve body comprising a portion of said fluid bypass;

said valve body having a central longitudinal axis defined therethrough, and a longitudinal dimension defined parallel to said longitudinal axis, with said displaceable member means being movable in a direction along said longitudinal dimension;

said valve body having a first fluid connection for being connected to one of said first and second chambers, and a second fluid connection for being connected to the other of said first and second fluid chambers, and an internal fluid chamber;

said first fluid connection comprising an orifice disposed substantially along said longitudinal axis;

said second fluid connection comprising an orifice disposed substantially perpendicular to said longitudinal axis and radially away from said longitudinal axis;

said valve seat being disposed about said orifice of said first fluid connection;

said spring plate being disposed within said internal fluid chamber and concentric with said orifice of said first fluid connection;

said first orifice of said spring plate being substantially aligned with said orifice of said first fluid connection, and said second orifice being disposed radially outward of said first orifice;

said first orifice has a diameter, and said displaceable member means has a diameter with said diameter of said displaceable member means being sufficiently larger than said diameter of said first orifice to substantially close said first orifice;

said displaceable member means having a valve body portion for contacting said spring plate, said valve body portion comprising a ring-shaped projection with a diameter less than said diameter of said displaceable member means and greater than said diameter of said first orifice;

said second orifice having a diameter less than said diameter of said first orifice;

said adjustable valve means further comprises plate means disposed opposite said first fluid connection;

said plate means being fixed with said valve body and defining a surface of said internal fluid chamber;

said displaceable member means comprises a first portion disposed within said internal fluid chamber, and a second portion extending from said first portion and extending through said plate means;

said second portion of said displaceable member means has a diameter, and said means for receiving and transmitting pressure has a diameter, said diameter of said second portion being substantially less than said diameter of said means for receiving and transmitting pressure;

said internal fluid chamber of said adjustable valve means comprises a first internal fluid chamber;

said adjustable valve means further comprises a second internal fluid chamber disposed adjacent said first internal fluid chamber and separated from said first internal fluid chamber by said plate means;

said second internal fluid chamber of said adjustable valve means being oriented along said longitudinal axis;

said means for receiving and transmitting pressure being movably disposed within said second internal fluid chamber of said adjustable valve means for movement in said longitudinal direction;

said second internal fluid chamber of said adjustable valve means having a peripheral wall defining said second internal fluid chamber;

said means for receiving and transmitting pressure comprising seal means for sealing to said peripheral wall;

said means for receiving and transmitting pressure having a first side for contacting said second portion of said displaceable member means and a second side opposite said first side;

said pressure medium being disposed at said second side to pressurize said means for receiving and transmitting pressure and pressing said first side thereof into contact with said second portion of displaceable member means.

7. The vibration damper system according to claim 6, wherein:

said second internal fluid chamber of said adjustable valve means comprising an additional surface disposed towards said second side of said means for receiving and transmitting pressure;

said valve means comprising a conical spring plate disposed between said second side of said means for receiving and transmitting and said additional surface of said second fluid chamber;

said diameter of said second portion being about ⅕ of the diameter of said means for receiving and transmitting;

said vibration damper additionally comprises a second cylinder disposed concentrically about said first cylinder;

said second cylinder defining an annular chamber about said first cylinder;

said annular chamber being substantially filled with damping liquid and comprising a volume compensating space filled with air;

said annular chamber being fluidly connected to said second chamber of said vibration damper;

said piston comprising means for being attached to a frame of a motor vehicle;

said second cylinder comprising means for being attached to a suspension of a motor vehicle;

said piston further comprises a protective sleeve disposed concentrically about said second cylinder to protect said piston rod upon withdrawal of said piston rod from said first cylinder; and said first and second cylinders have a first end, said piston rod extending through said first ends, and said first ends comprising a piston rod guiding and sealing means for positioning said first cylinder, said second cylinder, and said piston rod with respect to one another and sealing about said piston rod and said first and second cylinders.

* * * * *